March 4, 1952 G. C. WICKS 2,588,314
ELECTRIC HEATER
Filed Oct. 16, 1947 3 Sheets-Sheet 1

GERALD C. WICKS
INVENTOR.

BY
ATTORNEY

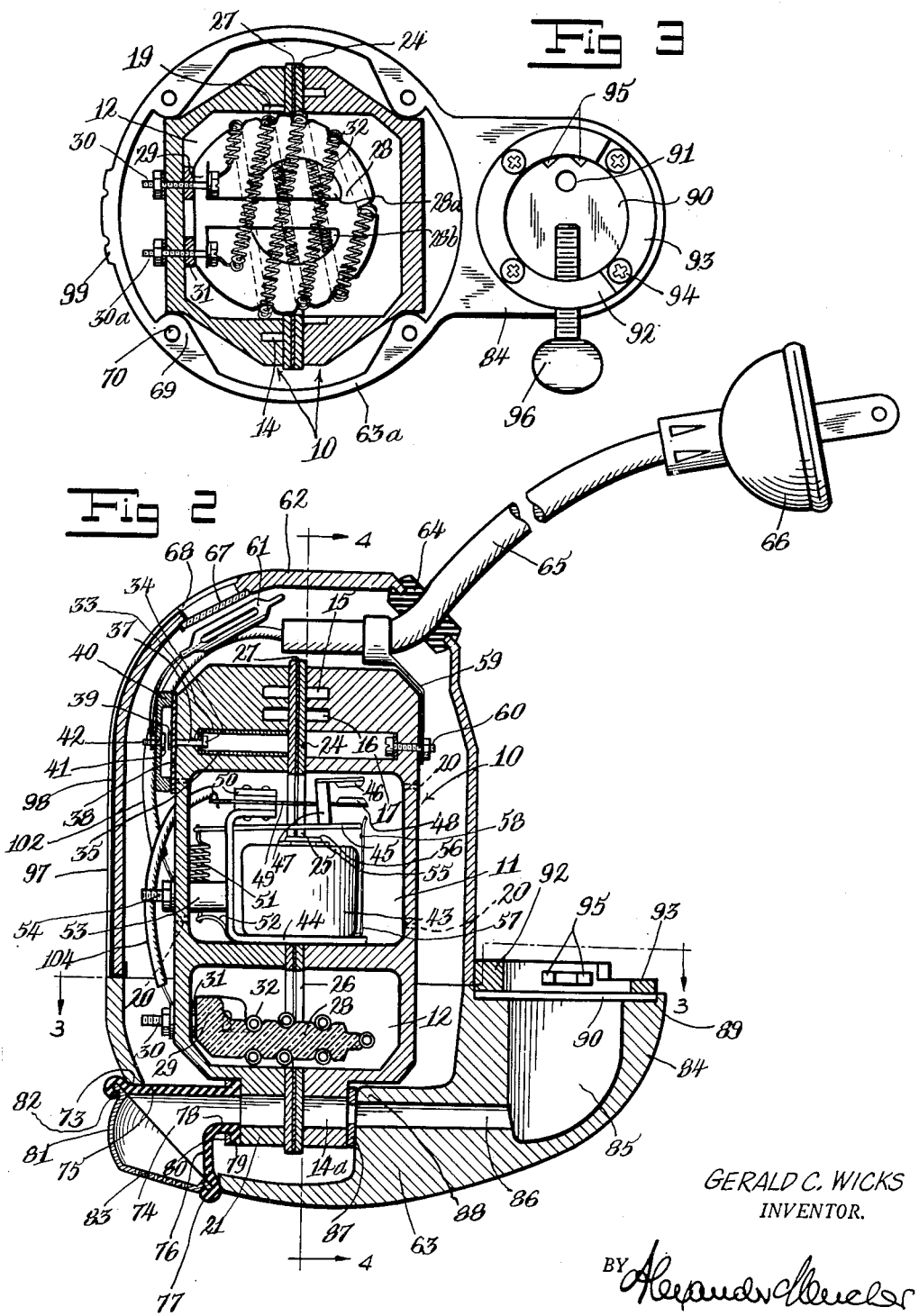

March 4, 1952     G. C. WICKS     2,588,314
ELECTRIC HEATER
Filed Oct. 16, 1947     3 Sheets-Sheet 3
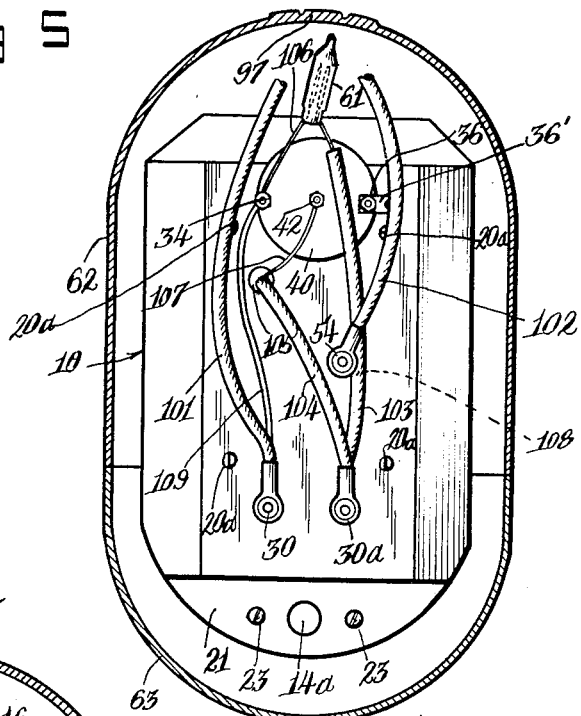
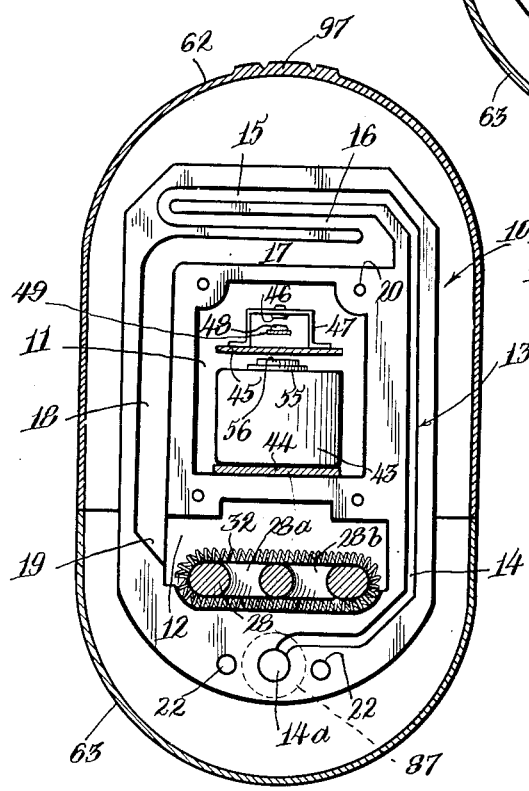
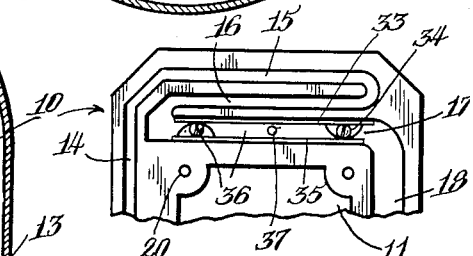
GERALD C. WICKS
INVENTOR.
BY *Alexander Meicher*
ATTORNEY Patented Mar. 4, 1952

2,588,314

UNITED STATES PATENT OFFICE 2,588,314

ELECTRIC HEATER

Gerald C. Wicks, New York, N. Y.

Application October 16, 1947, Serial No. 780,229

9 Claims. (Cl. 219—39)

This invention relates to electric heaters but more specifically to automatically operable and attachment type of heaters securable to fluid sources such as faucets and is an improvement over my U. S. Patent No. 2,400,618 dated May 21, 1946, and U. S. patent application Serial No. 641,911 filed January 18, 1946, now Patent No. 2,471,133, dated May 24, 1949.

Heretofore in attachment types of electric heaters either electrolytically operated or operated by passing a current through an electric heating element in direct contact with the water in a water heating compartment, derivative currents in the water have been found to be communicated both or either to the water source and the discharged hot water from the device giving rise to serious objections to the use of heaters of this type.

The present invention covers an attachment type of heater having internal inlet and outlet channels to and from another water compartment, said compartment and channels being formed from a pair of opposed and similar blocks of dielectric material. The inlet and outlet channels are adapted to be independently insulated and are of such dimensions as to give the water or fluid flow therethrough sufficient electrical resistance for service as effective resistors so that objectionable effects such as shocks are not communicated to the water source and to the discharged heated water.

A feature of the invention resides in the provision of internal inlet and outlet insulated channels in communication with a water heating compartment all forming part of a casing of dielectric material wherein the said channels are of such dimensions as to give the fluid flow therethrough resistor properties. Incidental to this feature is the provision of a pair of spaced electrodes mounted in the fluid path to serve as a means for controlling the energization of an electric heating element in direct contact with the water in the water heating compartment.

Another feature of the invention resides in the provision of a pressure switch in series circuit relation with the spaced electrodes to control the energization of the electric heating means in the water heating compartment during fluid flow, the said switch being responsive to fluid pressure within the fluid path of the device.

A further feature resides in the provision of an electric heater wherein the degree of temperature of the discharged water is controllable by the degree of opening of the fluid source valve.

These objects and other incidental ends and advantages of the invention will hereinafter appear in the progress of the disclosure and as pointed out in the appended claims.

Accompanying this specification are drawings showing a preferred form of the invention wherein:

Figure 2 is a longitudinal sectional view taken transversely of the heater shown in Figure 1.

Figure 3 is a sectional view of Figure 2 across the plane 3—3 thereof.

Figure 4 is a sectional view of Figure 2 across the plane 4—4 thereof.

Figure 5 is a sectional view of the heater showing the outer face of one of the casing blocks in elevation and the electric circuit conductors secured thereto.

Figure 6 is a partial plan view of the inner face of the casing block shown in Figure 5.

Figure 1:
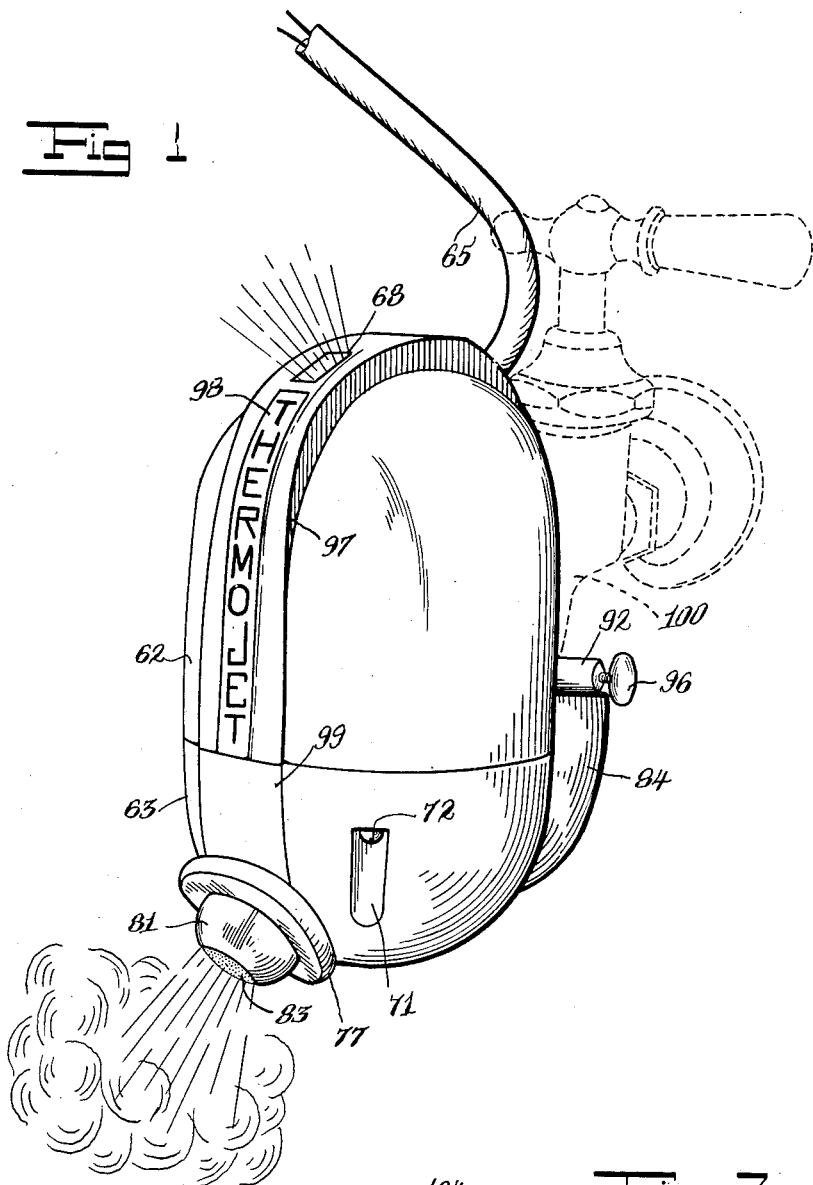
Figure 1 is a view in perspective of the heater in actual operation and is shown affixed to a water faucet.

In accordance with the invention and the preferred form shown, numeral 10 indicates generally each of a pair of identical block members of dielectric material such as porcelain or plastic adapted to abut and be secured to each other at the inner wall portions to form a water heating chamber provided with live electric heating elements supported therein and which is in contact with the water, and to further form insulated water or fluid inlet and outlet channels of such linear and cross-sectional dimensions to eliminate the communication of objectionable effects from derivative currents formed in the water heating chamber to the source of fluid or water supply and to the discharged heated water. Each of the block numbers 10 is adapted to further form a second chamber for the mounting of a relay assembly to control the energization of the electric heating elements in direct contact with the water or fluid within the heating chamber during fluid flow through the device.

Thus, each of the blocks 10 at the inner wall has spaced recesses 11 and 12 to form water heating and relay chambers, and a peripheral channel generally designated by numeral 13 to form respectively a water inlet and a water outlet, both being in communication with the water heating chamber. Channel 13 has a vertical leg 14 leading from an opening 14a which penetrates the bottom of each block 10 and proceed adjacent to the top to form a sinuous horizontal portion having legs 15, 16 and 17 and a downwardly extending vertical leg 18 which terminates in communication with recess 12 as indicated by numeral 19. Each of blocks 10 between recess 11 and channel leg 14 is provided with openings 20 for securing the blocks together as by means of securing screws or bolts 20a. The blocks are further secured together at the outer and lower reduced ends 21 through openings 22 by suitable securing means such as bolts 23.

A cover or plate of dielectric material 24 is provided for affixation to the inner wall of each of blocks 10 and has cut-outs 25 and 26 to register with the recesses 11 and 12 respectively, the cover plate serving to form the outer wall of each of the channels 13. Suitable packing is provided for waterproofing each of the channels 13 of blocks 10 as well as for waterproofing the peripheries of water and relay chambers 11 and 12. Additional packing 27 is provided between plates 24 when the blocks are secured together to maintain the water chamber water-tight.

In the water heating chamber formed between the recesses 12 of blocks 10 are the exposed or live electric heating elements in direct contact with the water or fluid contents. This takes the form of electrodes between which a current passes either electrolytically or by means of a resistance element. However, as shown a disc or core 28 of dielectric material having spaced openings 28a and 28b for water circulation therethrough and having an attaching bracket 29 for affixation to the inner wall of recess 12 of one of the block members by suitable means such as bolts and nuts 30 and 30a at gaskets 31 has a heating element or coil 32 wound therearound. The ends of said coil are secured to the inner ends of bolts 30 and 30a which serve as exposed and live electrodes, the outer ends of said bolts on the outer wall of said block 10 being adapted to serve as terminals for electric circuit connections. Disc 28 is adapted to extend into the opposite recess 12 of the opposing block as best shown in Figures 2 and 3.

As controlling means for the energization of coil 32 there is provided a pair of electrodes electrolytically operated by water flowing therebetween in series circuit relation with a pressure switch. Thus, and as shown in Figures 2 and 6, a metallic plate 33 is mounted on the upper wall of channel leg 17 of one of the blocks hereinafter designated as outlet block 10 as by a bracket and bolt 34 and a similar metallic plate 35 is mounted oppositely on the lower wall of said channel leg as by a bracket and bolt 36. Channel 13 of outlet block 10 serves as the fluid or water outlet channel hereinafter so designated while the channel of the opposite block serves as the water inlet channel hereinafter so designated. The leg 17 of outlet channel 13 is broader and deeper than legs 14, 15 and 16 for properly spacing the electrodes 33 and 35 and effectively acting as an electrode chamber, and the vertical leg 18 may be broader than vertical leg 14. The corresponding legs of the channel 13 of the inlet block 10 are similarly dimensioned. Thus, water flows in the outlet channel from the water chamber of recesses 12 and proceeds through broad leg 18 at the mouth 19, the electrode chamber or leg 17, narrower and shallower legs 16 and 15 and finally through the restricted leg 14 to the discharge 14a. Similarly the inlet block 10 has the inlet channel 13 wherein the inlet 14a at the water supply communicates with legs 14, 15, 16, 17 and 18 (Figure 4) through mouth 19 into the water chamber. By virtue of such reduced dimensions or length of the channels in both blocks, derivative currents having objectionable effects from the water heating chamber formed from recesses 12 and the electrode chamber or leg 17 are not communicated to the water source and to the discharged and heated water because the flow of fluid or water in such restricted insulated channels per se offers ohmic resistance and serves as effective resistors to eliminate shocks or other objectionable effects.

In leg 17 of outlet block 10 is an orifice 37 penetrating the said block and opening against a resilient diaphragm such as a rubber disc 38 having a central and an electrical contact 39 on the opposite side, the said diaphragm being mounted against the outer wall of the block member by a diaphragm frame 40. Frame 40 has a central electrical contact 41 oppositely spaced from contact 39, the contact 41 having a terminal 42 on the outside of the diaphragm frame. Bolts 34 and 36 conductively connected to electrodes 33 and 35 respectively terminate on the outside of diaphragm frame 40 as shown in Figure 5 to form terminals to facilitate electrical connections as will hereinafter appear.

Figure 7:
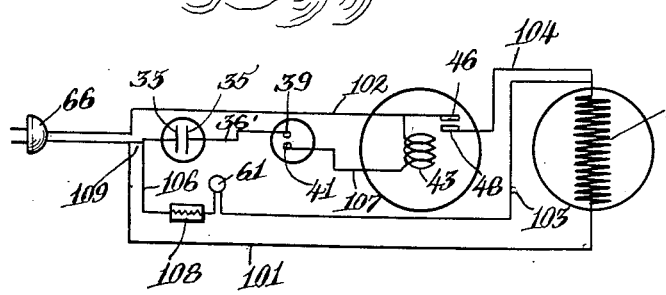
Figure 7 is an electric circuit diagram for the heater.

A relay assembly comprised of a circuit breaker and a winding to interrupt relay contacts is mounted as shown in recess 11 of the outlet block and extends into the recess of the opposite inlet block. The winding or coil generally designated by numeral 43 is supported on a bracket 44 while an armature 45 carries an interrupter relay contact 46 at bridge 47. The second interrupting relay contact 48 is at the end of a conducting spring 49, the other end of said spring being secured to the top of bracket 44 by means of insulating plates 50, the said spring passing through bridge 47. Armature 45 penetrates and pivots on the vertical leg of bracket 44 and has the inner end attached to one end of a spring 51, the opposite end of spring 51 being anchored to bracket 44 as at 52. Bracket 44 is attached to the outlet block 10 by means of a conducting stud 53 which terminates in a terminal 54 which penetrates the rear wall of recess 11 in the outlet block as best shown in Figure 2. Terminal 54 as will be shown hereafter in the electric circuit diagram of Figure 7 is connected to one end of coil 43 and to relay contact 46.

An opening 105 opposite recess 11 in the outlet block 10 permits a circuit conductor 104 connected to conductor spring 49 of relay contact 48 to penetrate block 10 for electrical connections, while numeral 56 at washer 55 indicates the iron core of coil 43 to magnetically draw and disengage armature 45 in the conventional manner.

To prevent fusing, sparking and oscillation between the relay contacts 46 and 48 due to changes in water conductivity between the electrodes 33 and 35 in the outlet block 10, as will hereinafter appear, there is provided a deflectable nipple obstruction in the path of the spring-urged armature 45. The deflectable nipple obstruction comprises a resilient arm 57 mounted on bracket 44 and carrying a nipple 58. By using such deflectable nipple, armature 45 must first deflect the position of the spring and nipple to engage core 56. It is only for a pre-determined maximum current flow through coil 43 that the position of deflectable nipple 58 is overcome for electrical engagement between relay contacts 46 and 48. And similarly armature 45 remains in contact with iron core 56 to cause current flow through the heating coil 32 until a pre-determined minimum flow of current goes through coil 43 at which time the force of the armature spring 51 frees armature 45 by deflecting nipple obstruction 58 to break the flow of current through the heating coil 32 as will hereinafter appear.

In inlet block 10 and on the outer wall thereof opposite leg 17 of the inlet channel 13 is a clip 59 secured by a nut and bolt 60 passing through leg 17, the said clip serving to relieve strain on the power supply line 65 passing therethrough for furnishing electrical energy for the heating device. An electric bulb 61 is supported by circuit conductors on the outlet block 10 and is adapted to be energized when the heating element 32 is in operation as will hereinafter appear.

The inlet and outlet blocks 10 secured together as described and having mounted therein the relay assembly in cooperating chambers 11, the resistance element 32 in cooperating chambers 12, the electrodes 33 and 35 and the pressure switch in the outlet channel 13, and the externally mounted light bulb 61 constitute the integrated body of the heating device wherein opening 14a of the inlet block 10 constitutes the inlet channel mouth and the aligned and opposite opening 14a of the outlet block constitutes the outlet channel discharge. This integrated body has no exposed walls in conductive communication with the water flow in the fluid path of channels 13 and recesses 12 and is also protected at the inlet channel mouth 14a and at the outlet channel discharge 14a against communication of derivative currents from the water heating chamber and the electrode leg or chamber 17 by the resistor-acting fluid flow in the inlet and outlet channels 13.

An adapter member for connecting the source of water of fluid supply such as from the spout of a faucet to the inlet channel mouth 14a of inlet block 10 and for connecting the outlet channel discharge 14a of outlet block 10 to the adapter discharge end is provided and as shown constitutes a supporting base for the integrated body of the heating device. This adapter base preferably of dielectric material and indicated by numeral 63 also serves as a mounting for and co-operates with an upper casing member also preferably of dielectric material such as 62 to form a spaced outer jacket for the body. Adapter base 63 is substantially cylindrical and has a rounded bottom wall and an upper supporting edge 63a for the opposing lower edge of casing member 62 which is shown in the form of a cylindrical shell provided with a substantially semi-spherical top. On the rear side of the top of casing 62 is an opening covered by an insulated ring 64 through which the power line 65 connected to an electric plug 66 passes, and on the opposite side is an opening opposite bulb 61 for viewing a light signal when the device is in operation. The light opening as shown and at the underside has a colored transparent member such as glass 67 and at the upper side has a transparent or translucent panel 68.

The supporting edge 63a of the adapter base 63 and the opposite edge of casing 62 are each provided with a plurality of extensions inwardly of the diameters thereof at preselected angles, said extensions being in alignment and proceeding downwardly and upwardly respectively from the edge 63a of the adapter base 63 and the lower edge of the casing 62. Said extensions are shown on Figures 1 and 3 only in connection with adapter base 63 and are each indicated by numeral 69. The extensions 69 of adapter base 63 are each provided with orifices 70 and are excavated from the outer walls as indicated by vertical sockets 71 to support the heads of screws 72 which penetrate said extensions through orifices 70 and the corresponding extensions in the upper casing 62 for demountably securing the jacket parts together.

The aligned extensions 69 in adapter base 63 and in casing 62 engage the outer wall portions of the blocks 10 against rotation as best shown in Figure 3. For this purpose the blocks 10 at the outer walls and when in attached position are polygonal in form so that selected wall portions are engaged by the extensions 69 of the casing 62 and adapter base 63.

Adapter base 63 is intended to provide a forward orifice 73 through which a resilient discharge outlet 74 penetrates and which is connected to the outlet channel discharge 14a The discharge outlet 74 as shown is in the form of an obliquely formed cup having a horizontal top wall portion 75 and a vertically directed lower wall portion 76, both of said walls extending from a neck 78 having an attaching flange 79 for engagement with the outlet channel discharge 14a as by a securing ring 80. The mouth of cup 74 is provided with a channelled bead 77 disposed in an oblique plane and situated adjacent the edges of orifice 73. Engaged with the channel in bead 77 of cup 74 is a sprayer member 81 having an engaging flange 82, the lower edge of the body of said sprayer member tapering rearwardly to provide an obliquely disposed and perforated bottom wall 83 through which heated water from the cup 74 emerges in a spray. Cup 81 is capable of being ejected from bead 77 when the openings in the bottom wall 83 become clogged by either water or steam pressure. Moreover the body comprised of blocks 10 may be removed from adapter base 63 by first detaching the sprayer member 81 from bead 77 and thereafter compressing resilient or rubber cup 74 secured to the outlet panel discharge 14a on inward withdrawal from orifice 73.

Adapter base 63 further provides a coupling means for the spout of a water faucet and a delivery channel to the inlet channel mouth 14a of inlet block 10. The coupling means and delivery channel are formed in the adapter base rearwardly of orifice 73 by means of a lug extension 84. Thus, the lug extension 84 is provided with a vertical channel 85 which is in communication with a horizontal channel leg 86 terminating against a gasket 87 surrounding and secured to the inlet channel mouth 14a of inlet block 10. The shoulder 88 is formed at the end of channel leg 86 to support the shoulder of inlet block 10 adjacent the reduced lower portion 21 as best shown in Figure 2. Shoulder 88 in combination with extensions 69 prevent rotary, tilting and vertical movement of the body comprised of blocks 10 within the jacket formed by casing 62 and adapter base 63 without resorting to attaching means.

The mouth of vertical channel 85 is provided with a seat 89 to support a diaphragm 90 having an orifice 91 in an off-central position (Figure 3). Diaphragm 90 is secured in seat 89 by means of a ring member 92 having as shown a depressed segment 93 at the ring end. Ring member 92 including portion 93 is secured over diaphragm 90 conventionally as by screws 94 and is provided with a thumb screw 96 which penetrates said ring member and which is directed toward and between a pair of spaced jaw points 95 adjacent opening 91. As shown thumb screw 96, diaphragm orifice 91 and spaced jaw points 95 lie parallel with the transverse axis of the heating device. The shank of a spout is adapted to be supported on depressed ring segment 93 while the side walls of the spout are secured between the inner walls of ring 92, adjustable thumb screw 96 and jaw points 95. This means of coupling the spout of a faucet is elastic for various sizes and shapes of spouts and spout shanks and insures alignment between the off-center diaphragm orifice 91 and the spout mouth. The diaphragm 90 serves as a gasket between the spout mouth and the diaphragm orifice 91.

The jacket of wthe integrated body comprised of blocks 10 as shown is provided with decorative means such as aligned ribs 97 and 99 on casing 62 and adapter base 63 and a recess on the outer wall of rib 97 for the introduction of a name plate. These decorative features are shown in Figure 1 which also illustrates in phantom a water faucet 100.

The electrical connections are shown in Figures 5 and 7. Figure 5 shows the conductors of three electric circuits in parallel across the power terminals on the outside of outlet block 10, while the electric circuits themselves are shown in Figure 7.

The first circuit comprises a circuit breaker having the winding 43 which is effective to open interrupting relay contacts 46 and 48 upon de-energization of coil 43. The winding or coil 43 is connected across the terminals of the power supply in series circuit relation to the spaced electrodes 33 and 35 and to the diaphragm contacts 39 and 41. Thus, one end of relay coil 43 has a circuit conductor 107 leading to diaphragm frame contact 41 as at terminal 42, circuit conductor 36' leads from diaphragm contact 39 to the terminal 36 of electrode plate 35, conductor 109 leads from the terminal 34 of electrode plate 33 to one terminal of the power source. The other end of relay coil 43 as at terminal 54 (which is also the terminal for relay contact 46) is connected by conductor 102 to the other terminal of the power source.

The circuit of electric bulb 61 and series resistor 108 lies across the power terminals in series with the interrupting relay contacts 46 and 48. Thus, circuit conductor 102 leads from one terminal of the power supply to terminal 54 of relay contact 46, circuit conductor 104 leads from the second relay contact 48 to one terminal 30a of resistance element 32, circuit conductor 103 containing a series resistor 108 leads from terminal 30a to bulb 61, and circuit conductor 106 proceeds from bulb 61 and leads through conductor 109 to conductor 101 which is connected to the other terminal of the power supply.

The circuit of the heating element 32 is connected across the terminals of the power source in series circuit relation with the interrupting relay contacts 46 and 48. Thus, circuit conductor 101 from one terminal of the power source leads to one terminal 30 of resistance element 32, circuit conductor 104 leads from the other terminal 30a of the resistance element to the relay contact 48, and circuit conductor 102 leads from terminal 54 of relay contact 46 to the other terminal of the power source.

From the foregoing description of the heating device it may be seen that fluid or water in the water heating chamber formed from recesses 12 at all times submerges resistance coil 32 during current flow to prevent overheating. There is a tortuous constricted flow of water from the faucet through the insulated and narrow inlet channel 13 of inlet block 10 to the top of the water heating chamber and a similar outflow path in the outlet channel 13 of the outlet block 10 from the top of the water heating chamber to the discharge end or sprayer member of the adapter base 63. The channels 13 of each of the blocks 10 control the output per unit time of the water flowing through the integrated body formed from the said blocks. The flow of water through each of the restricted and insulated channels 13 by virtue of the dimensions of said channels practically reduces the communication of derivative currents in the water of the water heating chamber which is exposed to the live electrical elements to the discharged hot water and to the faucet itself.

The handle of faucet 100 functions for volume control and the supply of both water and predetermined water pressure in the fluid path of the blocks comprised of channels 13 and water chamber 12 closes a power circuit through the resistance element 32. The degree of opening or turn of the faucet handle controls the temperature of the water discharged from the device. When the handle is partly turned, the water will issue almost boiling; when half turned the water will issue hot and when fully turned will issue warm. The handle of the faucet 100 may thus be considered as a temperature control.

Electrodes 33 and 35 in the fluid path and as shown in outlet channel 13 are adapted to close the interrupting contacts of the relay assembly when the gap between the electrodes is electrically closed by the presence of water. When the relay contacts 46 and 48 are closed by the intervention of water, current should go through the resistance coil 32 from the power source. However, for safety purposes there is provided in electric circuit series with the electrodes 33 and 35 a pressure switch wherein the diaphragm 38 thereof also is in the fluid path and preferably in communication with leg 17 of outlet channel 13 so that in the event the gap between the electrodes is closed by water but in the absence of predetermined pressure flow, the resistance element 32 will not be energized. When the resistance element 32 is energized the pilot light 61 is on to indicate to the consumer that the device is in operation.

It is to be noted that the total area of the openings in the sprayer plate 83 is controlled to allow sufficient time exposure of the water within the water heating chamber for heat absorption as are the dimensions in the fluid path in blocks 10 to create a predetermined pressure to operate the pressure switch.

In operation the handle of faucet 100 is opened for water flow through the body 10. Water flows through diaphragm opening 91 into channels 85, 86, inlet channel mouth 14a, legs 14, 15, 16, 17 and 18 of inlet channel 13 and through mouth 19 into the water heating chamber and from mouth 19 of the outlet channel 13 through the legs 18, 17, 16, 15, 14 and outlet channel discharge 14a through cup 74 and out of sprayer plate 83. When the water is turned on, the water heating chamber after a certain lapse of time, is filled with water which submerges the resistance element 32 and thereafter overflows through the outlet channel discharge 14a and through cup 74 and sprayer plate 83. As soon as the gap between electrodes 33 and 35 in the leg 17 of outlet channel 13 is filled by a water flow the pressure of which closes the contacts 39 and 41 of the pressure switch, the water conductivity and the pressure from the water flow closes the power circuit across the resistance element 32.

When the faucet handle is turned to complete off-position, no more water momentarily will pass through sprayer plate 83. However, the device will remain full and the stored water within the water heating chamber will not be further heated because of the resultant opening of the pressure switch contacts 39 and 41. If the flow of water or temperature thereof through the device is below the minimum required to absorb the heat developed by the resistance element 32, the water will boil and the steam created will force the water out of the outlet channel 13 and open the electrode gap until more water passes through the outlet channel 13 to close said electrode gap. Of course the gap between the electrodes remains open in the presence of water vapor and steam pressure, but the pressure switch is closed only when there is sufficient water flow or steam pressure in outlet channel 13. Consequently, when the water is turned off no current flows through the resistance element in the water heating chamber. Because the resistance element 32 is below the top of the water heating chamber as shown, current therethrough will be cut off while the element is completely submerged in the water.

When water starts to flow in the leg 17 of the electrode chamber having electrode plates 33 and 35, the gap between said plates is invaded gradually. The water thus acts as a rheostat in the circuit. The consequent progressive increase in voltage may cause flickering between contacts 46 and 48 due to the alterations of the current. Therefore, to prevent fusing and sparking between the circuit interrupting contacts 46 and 48, the deflectable nipple 58 is provided to serve as an obstruction in the path of the spring-urged armature 45 so that the armature has to force nipple 58 out of its path to engage the energized core 56. This takes place only at a predetermined maximum current flow through the relay coil 43. And similarly the armature 45 remains in contact with the energized core 56 to cause current flow through the resistance element 32 until a predetermined minimum flow of current passes through the relay coil 43 at which time the force of the armature spring 51 frees armature 45 by deflecting the nipple obstruction 58 to break the flow of current through the resistance element 32.

The heating device above described may be considered as an automatic instant heater attachable to a faucet and which is small, safe, compact, easily assembled and dismantled, and characterized for its high efficiency, sure performance, length of life and simplicity.

I wish it understood that other fluids having similar conductivity properties as water may be heated by the device described and that minor changes and variations in the material, location, integration, size and shape of parts may all be resorted to without departing from the spirit of the invention and the scope of the appended claims.

I claim:

1. In an electric water heater, a body having an internal insulated fluid chamber, exposed electric heating elements in said chamber, a fluid path for said chamber and through said body comprising electrically non-conducting restricted channels of preselected dimensions formed in said body and leading into and out of said fluid chamber so that fluid flow through said restricted channels ohmically resists communication of effective derivative currents from the chamber and formed therein by contact between the fluid and the heating element, and circuit controlling means in one of said channels and comprising a pair of spaced electrodes and a pressure switch in series electric circuit, the said electrodes being adapted to be electrically closed by and when intervened by water and the pressure switch being adapted to be electrically closed when there is fluid flow at predetermined pressure.

2. In an electric water heater, a pair of blocks adapted for opposite engagement and each having cooperating recesses to form an insulated fluid chamber, exposed electric heating elements in said fluid chamber, each of said blocks having formed therein electrically non-conducting restricted channels of preselected dimensions to form a fluid path through said blocks with said fluid container so that the fluid flow in said restricted channels ohmically resists communication of derivative currents from the chamber and formed therein by contact between the fluid and the heating elements, and circuit controlling means in one of said channels and comprising a pair of spaced electrodes and a pressure switch in series electric circuit, the said electrodes being adapted to be electrically closed by and when intervened by water and the pressure switch being adapted to be electrically closed when there is fluid flow at predetermined pressure.

3. In an electric water heater, a body having an internal insulated fluid chamber, exposed electric heating elements in said chamber, a fluid path through said body communicating with the fluid chamber adjacent the top thereof and comprising electrically non-conducting restricted channels of preselected dimensions formed in the body so that the fluid flow in said channels ohmically resists communication of effective derivative currents from the chamber and formed therein by contact between the fluid and the heating elements, and circuit controlling means in one of said channels and comprising a pair of spaced electrodes and a pressure switch in series electric circuit, the said electrodes being adapted to be electrically closed by and when intervened by water and the pressure switch being adapted to be electrically closed when there is fluid flow at predetermined pressure.

4. In an electric water heater, a body having an insulated internal fluid chamber, exposed electric heating elements along the bottom of said chamber, a fluid path through said body communicating with the fluid chamber adjacent the top thereof and comprising an electrically non-conducting restricted inlet channel and an electrically non-conducting restricted outlet channel, the channels being of preselected dimensions so that the fluid flow in said channels ohmically resists communication of effective derivative currents from the chamber and formed therein by contact between the fluid and the heating elements, and circuit controlling means in the outlet channel and comprising a pair of spaced electrodes adapted to be electrically closed by and when intervened by water, and a pressure switch in series electric circuit with said electrodes disposed in the fluid path and being adapted to be electrically closed when there is fluid flow at predetermined pressure.

5. In an electric water heater, a body having an insulated internal fluid chamber, exposed electric heating elements in said chamber, a fluid path through said body communicating with the fluid chamber and comprising an electrically non-conducting restricted inlet channel and an electrically non-conducting restricted outlet channel, the channels being of preselected dimensions so that the fluid flow in said channels ohmically resists communication of effective derivative currents from the chamber and formed therein by contact between the fluid and the heating elements, and circuit controlling means in the fluid path comprising a pair of spaced electrodes and a pressure switch in series electric circuit, the said electrodes being adapted to be electrically closed by and when intervened by water and the pressure switch being adapted to be electrically closed when there is fluid flow at predetermined pressure.

6. In an electric water heater, a body having an insulated internal fluid chamber, exposed electric heating elements in said chamber, a fluid path through said body communicating with the fluid chamber and comprising an electrically non-conducting restricted inlet channel and an electrically non-conducting restricted outlet channel, the channels being of preselected dimensions so that the fluid flow in said channels ohmically resists communication of effective derivative currents from the chamber and formed therein by contact between the fluid and the heating elements, and circuit controlling means in the outlet channel comprising a pair of spaced electrodes and a pressure switch in series electric circuit, the said electrodes being adapted to be electrically closed by and when intervened by water and the pressure switch being adapted to be electrically closed when there is fluid flow at predetermined pressure.

7. In an electric water heater, a fluid chamber, exposed electric heating elements in said chamber, inlet and outlet paths through and in the walls of said chamber to form a fluid path therewith and comprising electrically non-conducting restricted channels of preselected dimensions formed in the walls of said chamber so that the fluid flow through said restricted channels ohmically resists communication of effective derivative currents from the chamber and formed therein by contact between the fluid and the heating elements, and circuit controlling means in the fluid and the heating elements, and circuit controlling means in the fluid path comprising a pair of electrodes and a pressure switch in series electric circuit adapted to be electrically closed respectively by and when intervened by water and by predetermined fluid flow pressure.

8. In an electric water heater, a fluid chamber having heating electrodes therein, an inlet and an outlet of restricted dimensions to ohmically resist communication of derivative currents in communication with said fluid chamber and forming a fluid path therewith, and circuit controlling means in the fluid path comprising a pair of electrodes and a pressure switch in series electric circuit adapted to be electrically closed respectively by and when intervened by water and by predetermined fluid flow pressure.

9. In an electric water heater, a fluid chamber having heating electrodes therein, a second fluid chamber in communication therewith, and circuit controlling means in said second chamber comprising a pair of electrodes and a pressure switch in series electric circuit adapted to be electrically closed respectively by and when intervened by water and by predetermined fluid flow pressure.

GERALD C. WICKS.

REFERENCES CITED

The following references are of record in the file of this patent:

UNITED STATES PATENTS

| Number | Name | Date |
|---|---|---|
| 1,561,243 | Keene | Nov. 10, 1925 |
| 1,999,962 | Des Rosiers | Apr. 30, 1935 |
| 2,032,210 | Holt | Feb. 25, 1936 |
| 2,380,132 | Walther | July 10, 1945 |
| 2,400,618 | Wicks | May 21, 1946 |